US012563303B2

(12) United States Patent
Tosaki

(10) Patent No.: US 12,563,303 B2
(45) Date of Patent: Feb. 24, 2026

(54) IMAGE PICKUP APPARATUS, CONTROL METHOD, AND STORAGE MEDIUM FOR STREAMING BROADCASTS WITH PROGRAM SELECTION INDICATOR AND EXPOSURE CONTROL

(71) Applicant: CANON KABUSHIKI KAISHA, Tokyo (JP)

(72) Inventor: Takumi Tosaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 18/585,243

(22) Filed: Feb. 23, 2024

(65) Prior Publication Data

US 2024/0314446 A1 Sep. 19, 2024

(30) Foreign Application Priority Data

Mar. 16, 2023 (JP) ................................. 2023-042089

(51) Int. Cl.
*H04N 23/73* (2023.01)
*H04N 23/72* (2023.01)
*H04N 23/75* (2023.01)

(52) U.S. Cl.
CPC ............. *H04N 23/73* (2023.01); *H04N 23/75* (2023.01); *H04N 23/72* (2023.01)

(58) Field of Classification Search
CPC ........ H04N 23/73; H04N 23/75; H04N 23/72; H04N 23/667; H04N 23/71

USPC .......................................................... 348/362
See application file for complete search history.

(56) References Cited

U.S. PATENT DOCUMENTS

| | | | |
|---|---|---|---|
| 2010/0156830 A1* | 6/2010 | Homma | .............. G06F 3/04847 |
| | | | 345/173 |
| 2013/0329075 A1* | 12/2013 | Liang | ................... H04N 23/815 |
| | | | 348/222.1 |
| 2020/0177811 A1* | 6/2020 | Duran | .................... H04N 23/76 |

FOREIGN PATENT DOCUMENTS

| | | |
|---|---|---|
| JP | 2020017796 A | 1/2020 |
| JP | 2021034824 A | 3/2021 |

* cited by examiner

*Primary Examiner* — Usman A Khan

(74) *Attorney, Agent, or Firm* — Cowan, Liebowitz & Latman, P.C.

(57) ABSTRACT

An image pickup apparatus includes an imaging unit configured to image a captured image, and a processor configured to control exposure of the captured image. The processor is configured to control the exposure of the captured image in a first mode in a case where the processor has not acquired first information indicating that the captured image will be streamed next, and the processor is configured to control the exposure of the captured image in a second mode for controlling at least one of parameters that are used in the first mode, using a fixed value in a case where the processor has acquired the first information.

19 Claims, 4 Drawing Sheets

100

IMAGE PICKUP APPARATUS, CONTROL METHOD, AND STORAGE MEDIUM FOR STREAMING BROADCASTS WITH PROGRAM SELECTION INDICATOR AND EXPOSURE CONTROL

BACKGROUND

Technical Field

One of the aspects of the embodiments relates to an image pickup apparatus, an image pickup system, a control method, and a storage medium.

Description of Related Art

Image pickup apparatuses for automatically controlling various imaging parameters have recently been used in systems that output (stream or broadcast) one image (video) selected from images (videos) from a plurality of image pickup apparatuses. The image pickup apparatus receives, as a signal indicating a selection state of an image that is being output (output image), a program selecting signal indicating that the output image is being streamed and a preview selecting signal indicating that the output image will be streamed next. Japanese Patent Laid-Open No. 2021-34824 discloses a configuration that limits an upper limit of the driving speed of a pan and tilt mechanism when receiving a program selecting signal and a preview selecting signal. Japanese Patent Laid-Open No. 2020-17796 discloses a configuration that controls the execution of image stabilization when receiving a program selecting signal and a preview selecting signal.

However, the configuration of Japanese Patent Laid-Open No. 2021-34824 cannot deal with a flicker phenomenon caused, for example, by a shutter change in the exposure control. The configuration disclosed in Japanese Patent Laid-Open No. 2020-17796 cannot perform exposure tracking in a case where the luminance of an object changes, and thus changes the control for executing the image stabilization according to each exposure parameter.

SUMMARY

An image pickup apparatus according to one aspect of the disclosure includes an imaging unit configured to image a captured image, and a processor configured to control exposure of the captured image. The processor is configured to control the exposure of the captured image in a first mode in a case where the processor has not acquired first information indicating that the captured image will be streamed next, and the processor is configured to control the exposure of the captured image in a second mode for controlling at least one of parameters that are used in the first mode, using a fixed value in a case where the processor has acquired the first information. An image pickup system having the above image pickup apparatus also constitutes another aspect of the disclosure. A control method of the above image pickup apparatus also constitutes another aspect of the disclosure. A storage medium storing a program that causes a computer to execute the above control method also constitutes another aspect of the disclosure.

Further features of various embodiments of the disclosure will become apparent from the following description of embodiments with reference to the attached drawings.

DESCRIPTION OF THE EMBODIMENTS

Figure 1:
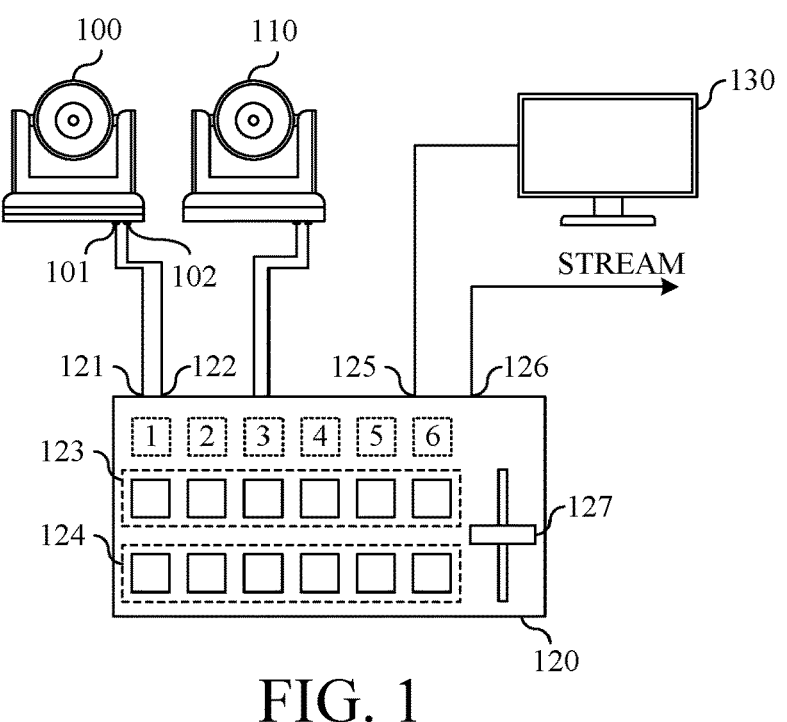
FIG. 1 illustrates an example of a configuration diagram of an image pickup system including an image pickup apparatus according to this embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

FIG. 1 illustrates an example of the configuration of an image pickup system including an image pickup apparatus according to this embodiment. The image pickup system includes image pickup apparatuses 100 and 110, a switcher (selection apparatus) 120, and a monitor 130.

The image pickup apparatus 100 includes an image output terminal 101 and a control communication terminal 102. The image output terminal 101 outputs an image (video) captured by the image pickup apparatus 100. The image output terminal 101 may use a terminal in accordance with standards such as SDI or HDMI (registered trademark), or an Ethernet (registered trademark) terminal by packetizing an image using Internet Protocol (IP). The control communication terminal 102 is used to communicate with an external device such as a control apparatus (switcher 120 in this embodiment). The control communication terminal 102 may use, for example, a terminal such as RS-232C or Ethernet (registered trademark).

The image pickup apparatus 110, similarly to the image pickup apparatus 100, includes an image output terminal and a control communication terminal.

The switcher 120 includes an image input terminal 121, a control signal terminal 122, a program selecting button 123, a preview selecting button 124, a monitor image output terminal 125, an image output terminal 126, and an image switching lever 127. The image input terminal 121 includes a plurality of terminals each used to acquire an image output from a corresponding one of the plurality of image pickup apparatuses (output image). The control signal terminal 122 includes a plurality of terminals each used to transmit a control signal to a corresponding one of the plurality of image pickup apparatuses. The control signals include selection signals from the program selecting button 123, preview selecting button 124, and the like. The program selecting button 123 is used to select a program image to be output (streamed) from the image pickup system from among images input to the plurality of image input terminals. At this time, a program selecting signal (second information) indicating that the output image is being streamed (selected as the program image) is transmitted to the control communication terminal connected to the image pickup apparatus that outputs the program image. The preview selecting button 124 is used to select a next preview image to be output (streamed) from the image pickup system from among images input to the plurality of image input terminals. At this time, a preview selecting signal (first information) indicating that the output image will be streamed next (selected as a preview image) is transmitted to the control communication terminal of the image pickup apparatus that outputs the preview image. The monitor image output terminal 125 outputs to the monitor 130 an image in which an image input to the image input terminal 121, a program image, and the preview image are arranged. The image output terminal 126 outputs the program image to a live streaming device, a program recorder, or the like. The image switching lever 127 switches the preview image to the program image.

In this embodiment, the switcher 120 is operated by the user, but may be configured to perform automatic control.

Figure 2:
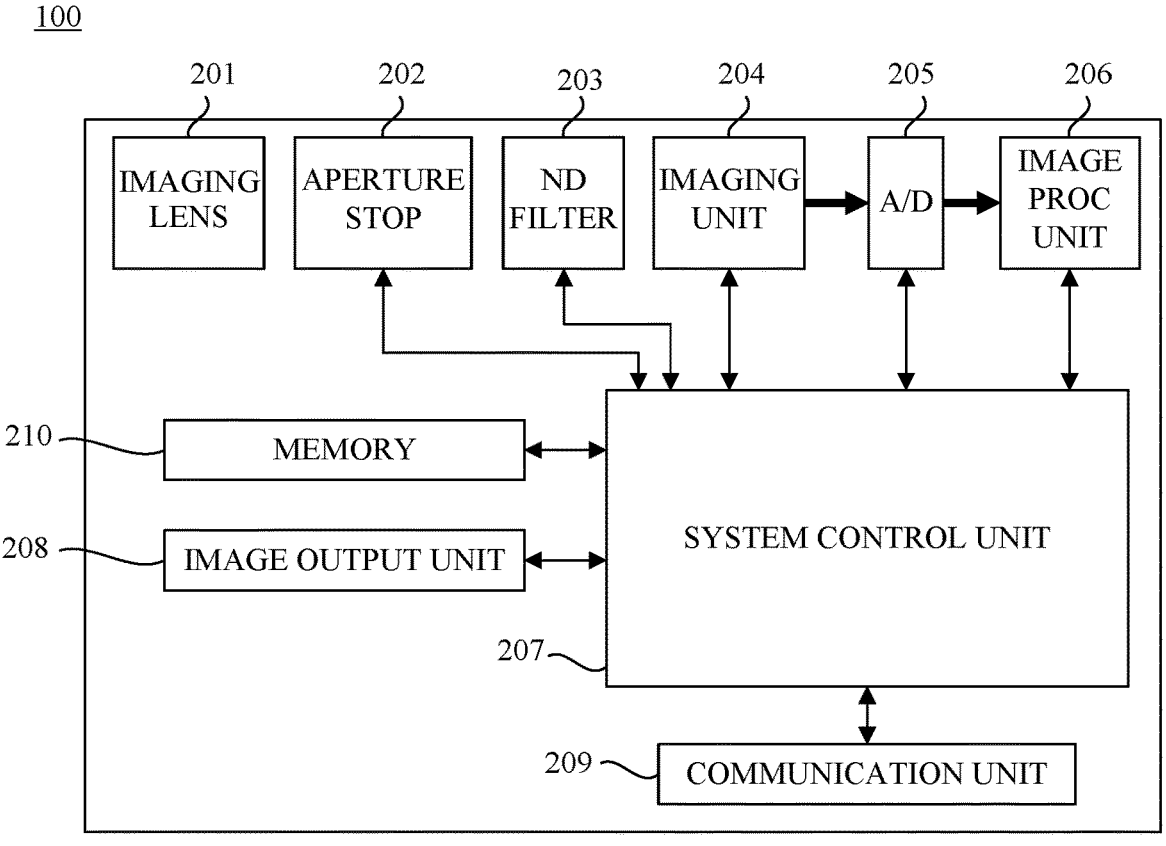
FIG. 2 is a block diagram illustrating the internal configuration of the image pickup apparatus.

FIG. 2 is a block diagram illustrating the internal configuration of the image pickup apparatus 100. The image pickup apparatus 110 also has an internal configuration similar to that of the image pickup apparatus 100.

The image pickup apparatus 100 includes an imaging lens 201, an aperture stop 202, an ND filter 203, an imaging unit 204, an A/D converter 205, an image processing unit 206, a system control unit 207, an image output unit 208, a communication unit 209, and a memory 210. The imaging lens 201 is a lens unit including a zoom lens, a focus lens, and an image stabilizing lens (shift lens), and forms an object image. The aperture stop 202 adjusts a light amount. The ND filter 203 is used to attenuate light. The imaging unit 204 includes an image sensor, such as a CCD or CMOS device, which converts the optical image into an electrical signal. The imaging unit 204 also has functions such as controlling accumulation using an electronic shutter, changing an analog gain, and changing a readout speed. The A/D converter 205 converts the analog signal output from the imaging unit 204 into a digital signal. The image processing unit 206 performs resizing processing such as pixel interpolation processing and reduction processing, detection processing for detecting luminance information, color information, and characteristic objects, color conversion processing, gamma correction processing, digital gain addition processing etc. for the signal from the A/D converter 205. The image processing unit 206 also performs predetermined calculation processing using a captured image (image data) and sends the calculation result to the system control unit 207. The system control unit 207 performs exposure control, focus detection control, white balance control, etc. based on the calculation result sent from the image processing unit 206. Thereby, through-the-lens (TTL) autofocus (AF) processing, auto-exposure (AE) processing, auto white balance (AWB) processing, etc. are performed. The image output unit 208 converts the image data generated by the system control unit 207 into a predetermined image format and outputs it to the switcher 120 via the image output terminal 101. The communication unit 209 communicates with an external device such as a control apparatus (switcher 120 in this embodiment). More specifically, the communication unit 209 transmits the communication data received at the control communication terminal 102 to the system control unit 207, and transmits the communication data instructed by the system control unit 207 via the control communication terminal 102. The memory 210 is an electrically erasable and recordable memory, such as an EEPROM. The memory 210 stores constants, programs, etc. for the operation of the system control unit 207. The program here is a program for executing a flowchart described below.

The system control unit 207 controls the entire image pickup apparatus 100. The system control unit 207 executes each processing according to this embodiment, which will be described below, by executing a program stored in the memory 210.

Figure 3:
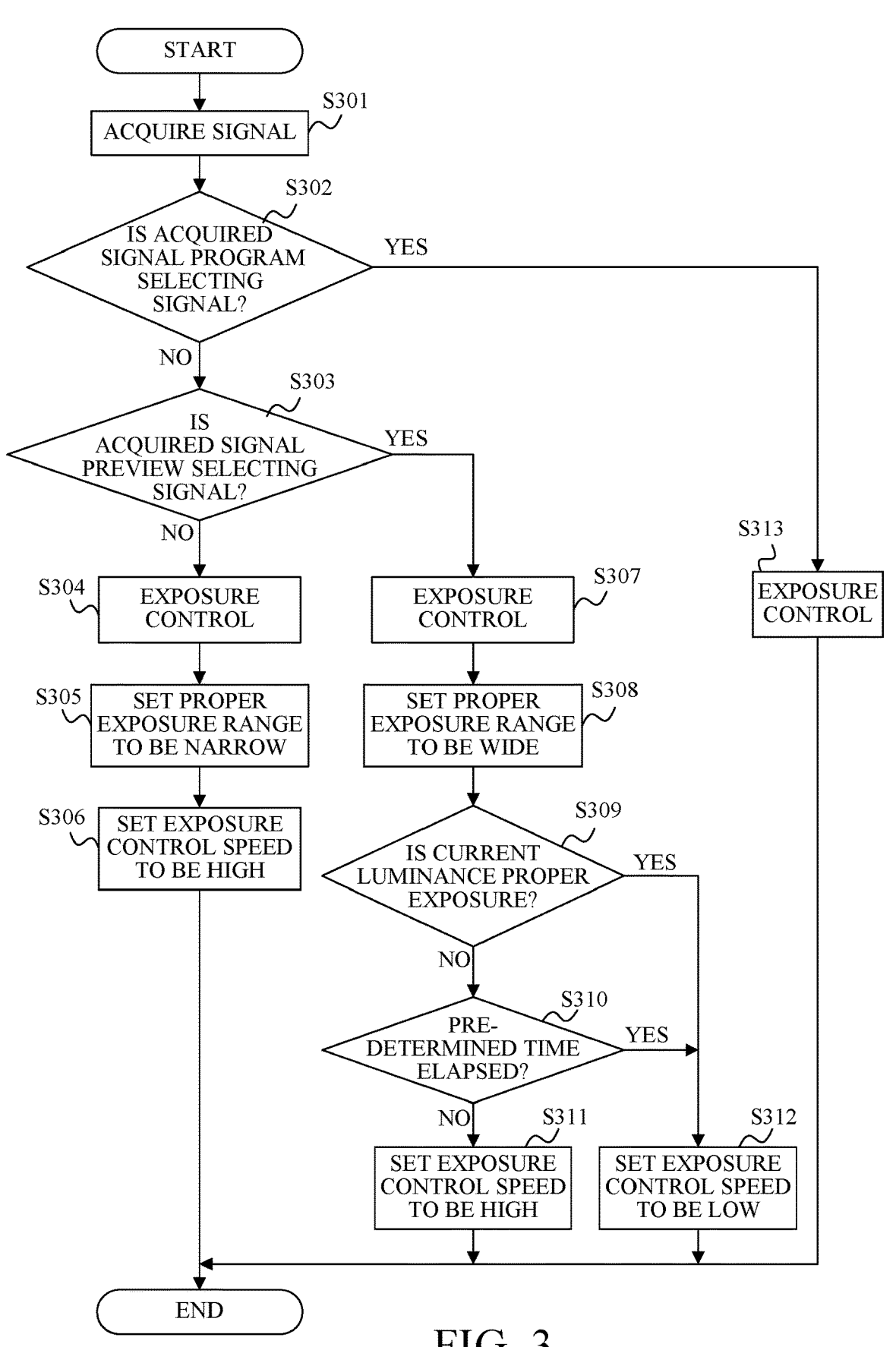
FIG. 3 is a flowchart illustrating exposure control processing.

FIG. 3 is a flowchart illustrating exposure control processing by the system control unit 207.

In step S301, the system control unit 207 acquires from the communication unit 209 the signal transmitted from the control signal terminal 122 to the image pickup apparatus 100.

In step S302, the system control unit 207 determines whether the signal acquired in step S301 is a program selecting signal. In a case where the system control unit 207 determines that the program selecting signal has been acquired, it executes the processing of step S313, and in a case where it determines that the program selecting signal has not been acquired, it executes the processing of step S303.

In step S303, the system control unit 207 determines whether the signal acquired in step S301 is a preview selecting signal. In a case where the system control unit 207 determines that the preview selecting signal has been acquired, it executes the processing of step S307, and in a case where it determines that the preview selecting signal has not been acquired, it executes the processing of step S304.

The processing in steps S304 to S306 is exposure control (exposure control in a first mode) in a state in which the system control unit 207 has not acquired a program selecting signal or a preview selecting signal (unselected state). In the unselected state, the monitor image output terminal 125 outputs the image of the image pickup apparatus 100, and outputting an image having proper luminance is prioritized to outputting an image having proper quality so that a user who switches an imaging angle of view and an object can easily recognize the image.

Figures 4A, 4B:
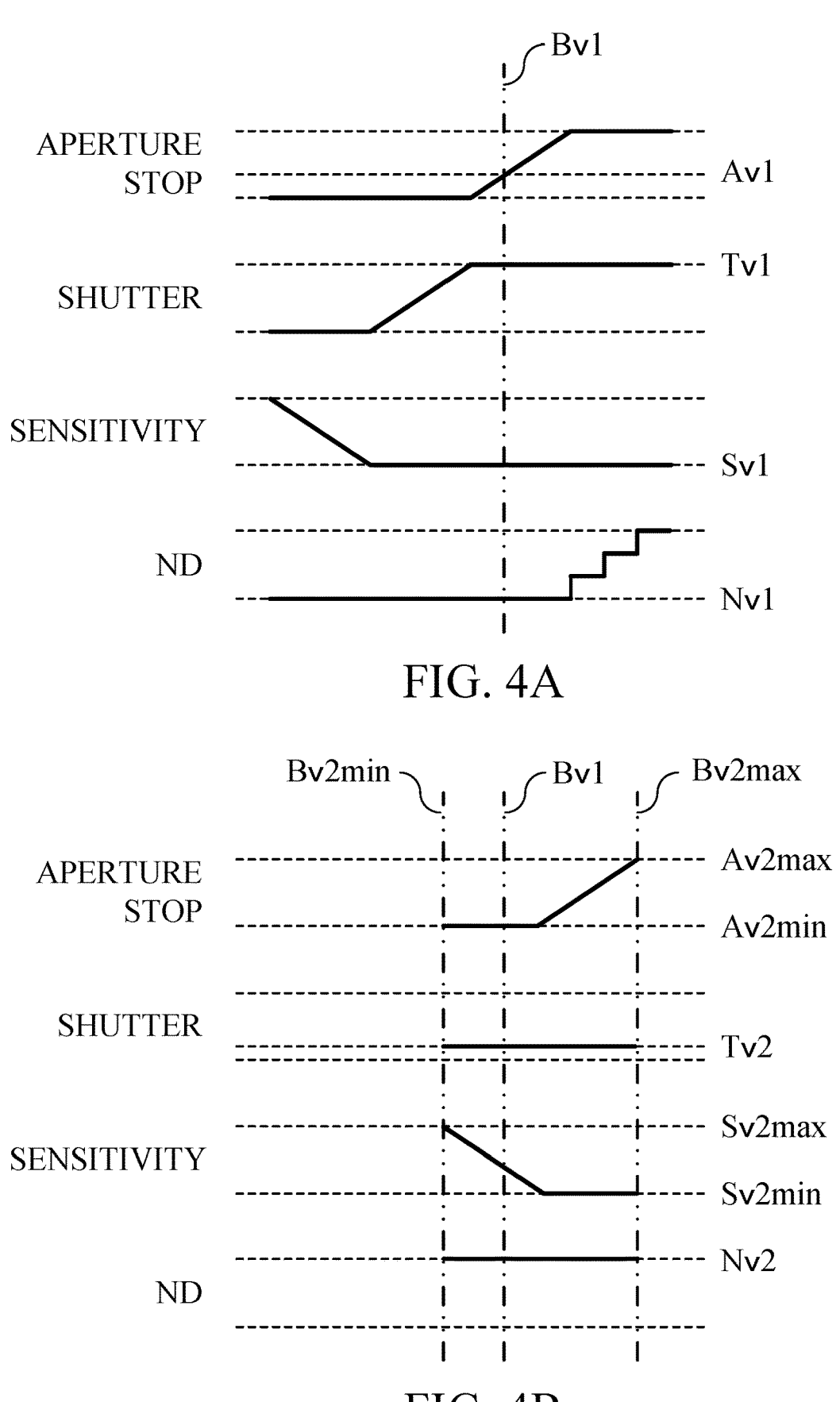
FIGS. 4A and 4B illustrate an example of the control order of exposure parameters.

In step S304, the system control unit 207 performs exposure control using exposure parameters including the ND filter 203, as illustrated in FIG. 4A. The sensitivity and shutter speed are more suitable to change exposure at a high speed than the ND filter 203 and the aperture stop 202, which take time to drive. Therefore, in this exposure control, it is conceivable to prioritize sensitivity and shutter speed and to control the aperture stop 202 and ND filter 203 after each of them reaches the upper or lower limit. This embodiment performs the exposure control in this control order, but is not limited to this example. Other exposure parameters may be controlled using an intermediate value. The intermediate value includes, for example, a shutter speed value that does not cause a flicker phenomenon, or a shutter speed value that intentionally causes a flicker phenomenon so that the system control unit 207 can easily detect it. In a case where the image pickup apparatus 100 is not selected, the image of the image pickup apparatus 100 is not output, so the movement of the ND filter 203 may appear in the image.

In step S305, the system control unit 207 sets the range in which exposure control is not performed (proper exposure range) to be narrow based on the proper luminance information. The system control unit 207 determines whether the luminance of the captured image transmitted from the image processing unit 206 is within the proper exposure range. In a case where the system control unit 207 determines that the luminance of the captured image is within the proper exposure range, it determines that there is no need to change the exposure. That is, by narrowing the proper exposure range in the unselected state, the frequency of exposure control based on changes in luminance increases, and more proper luminance can be maintained.

In step S306, the system control unit 207 sets the exposure control speed to be high. This can reduce the time required to transition to an image with proper luminance. The exposure control speed set in this step (the exposure control speed in exposure control in the first mode) is set to be higher than the exposure control speed in the second mode, which will be described below.

Each processing of steps S305 and S306 may or may not be executed.

Figure 5:
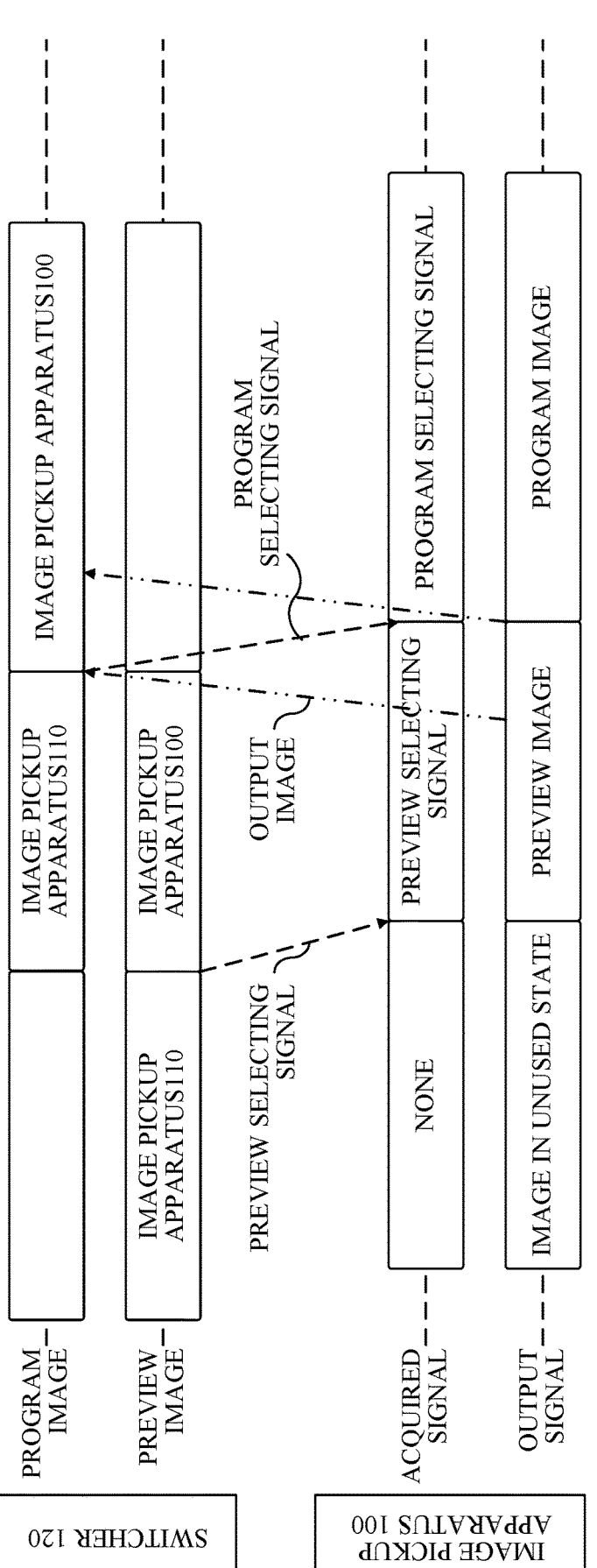
FIG. 5 illustrates each state of a switcher and the image pickup apparatus.

The processing in steps S307 to S312 is exposure control (exposure control in a second mode) in a case where the system control unit 207 has acquired the preview selecting signal. The program selecting signal is notified to the image pickup apparatus 100 when or after a program image output from the image output terminal 126 is switched. Therefore, as illustrated in FIG. 5, part of the image output as a preview image by the image pickup apparatus 100 may be output as a program image from the image output terminal 126 during switching. In consideration of such a case, the image pickup apparatus 100 that has acquired the preview selecting signal may set the preview image to a stable image so that it can be switched to the program image at any time. More specifically, exposure control for controlling (or for limiting a change in) at least one of the exposure parameters that is used in the first mode by using a fixed value is performed.

In step S307, the system control unit 207 controls the ND filter 203 and shutter speed using fixed values, as illustrated in FIG. 4B. Thereby, the operation of the ND filter 203, whose movement appears in the image, and the operation of the shutter, whose flicker phenomenon is generated by the frequency of the light source can be limited. That is, the system control unit 207 performs exposure control using only the aperture stop 202 and sensitivity.

The operation of the ND filter 203 is limited in a case where the system control unit 207 acquires a preview selecting signal (preview selecting state), but may operate in switching from an unselected state. In other words, the fixed value is a value that has been set in the unselected state (a value when the preview selecting signal was received), that is, it may or may not be a value of a parameter determined by the exposure control in the first mode executed just before the preview selecting signal was received. By using the value set in the unselected state, the movement of the ND filter 203 does not affect the program image even if it is selected as a program image just after switching to the preview selection state. On the other hand, it is generally considered that there is enough time for the ND filter 203 to drive after switching to the preview selecting state and before the image is selected as a program image, and thus a value different from the value that has been set in the unselected state may be used as the fixed value. In setting a different value to the fixed value, a value calculated from each exposure parameter in an unselected state may be set as a fixed value. For example, luminance Bv1 is calculated using the following equation (1):

$$Bv1 = Av1 + Tv1 - Sv1 + Nv1 \tag{1}$$

where Av1 is an aperture value (F-number) of the aperture stop 202 in the last unselected state, Tv1 is a value of the shutter speed, Sv1 is a value of the sensitivity, and Nv1 is a value of the ND filter 203.

Upper limit value Bv2max and lower limit value Bv2 min of the luminance are calculated by the following equations (2) and (3), respectively:

$$Bv2\text{max} = Av2\text{max} + Tv2 - Sv2\text{min} + Nv2 \tag{2}$$

$$Bv2\text{min} = Av2\text{min} + Tv2 - Sv2\text{max} + Nv2 \tag{3}$$

Here, Av2max and Av2 min are the upper and lower limit values, respectively, of the aperture stop 202 in the preview selecting state. Sv2max and Sv2 min are the upper and lower limits of the sensitivity in the preview selecting state, respectively. Tv2 is a value of the shutter speed in the preview selecting state. Nv2 is a value of the ND filter in the preview selecting state.

The value Nv2 may be set so that the luminance Bv1 falls within the range between the upper limit value Bv2max and the lower limit value Bv2 min, and the value ||Bv2max−Bv1||−||Bv1−Bv2 min|| is the minimum. Thereby, the luminance in the last unselected state can be used as a reference, and the luminance can be brought closer to the center of the controllable luminance range in the preview selecting state.

In step S308, the system control unit 207 sets the proper exposure range to be wider than the proper exposure range set in step S305. That is, making the proper exposure range wider in the preview selection state than that in the unselected state can reduce the frequency of the exposure control due to changes in luminance and output a stable image in comparison with the unselected state.

In step S309, the system control unit 207 determines whether the current luminance is proper exposure. In a case where the system control unit 207 determines that the current luminance is proper exposure, it executes the processing of step S312, and in a case where it determines that the current luminance is not proper exposure, the system control unit 207 executes the processing of step S310.

In step S310, the system control unit 207 determines whether a predetermined period has elapsed after it acquires the preview selecting signal. In a case where the system control unit 207 determines that the predetermined period has elapsed, it executes the processing of step S312, and in a case where it determines that the predetermined period has not elapsed, it executes the processing of step S311.

In step S311, the system control unit 207 sets the exposure control speed to be higher for a predetermined period. This step is performed in a case where proper exposure is not set when the preview selecting signal is acquired, that is, the image is not ready to be switched to a program image at any time. Accordingly, this step increases the exposure control speed for the predetermined period so that the proper exposure can be quickly set. Usually, in switching a preview image to a program image, it takes time to operate the program selecting button 123 or the image switching lever 127 by the user. Increasing the exposure control speed in the preview selecting state degrades the image quality, but does not affect the program image as long as it is within the user operation time (predetermined time) described above.

In step S312, the system control unit 207 sets the exposure control speed to be slower than that in steps S306 and S311. Thereby, a stable image with unnoticeable exposure changes can be output.

Each processing from step S308 to step S312 may or may not be executed.

The processing in step S313 is exposure control after the system control unit 207 receives the program selecting signal. The image pickup apparatus 100 that has acquired the program selecting signal may output an image with constant exposure and image quality so as not to give the user a sense of discomfort.

In step S313, the system control unit 207 fixes the exposure parameters. That is, the system control unit 207 does not perform exposure tracking even if the luminance changes depending on the object.

This embodiment fixes all exposure parameters in the control in step S313, but may perform exposure control so that at least one of the exposure parameters that are used in the first mode becomes a fixed value, similarly to the exposure control in the second mode. Moreover, in comparison with the exposure control in the second mode, exposure control in a third mode may be performed by slowing down the exposure control speed, widening the proper exposure range, or using a different control order.

As described above, the configuration according to this embodiment can change exposure control according to the signal acquired by the image pickup apparatus. Thereby, proper exposure control can be performed.

In this embodiment, the image pickup apparatus 100 performs AE control, but the exposure control operation may also be changed in accordance with a signal acquired by the image pickup apparatus even when the user manually operates the image pickup apparatus 100. Thereby, the user can change exposure parameters without being aware of factors other than luminance, such as a flicker phenomenon.

This embodiment illustratively limits the operations of the ND filter and shutter, but the user is less likely to be uncomfortable against the acquired image even if the parameter value of the ND filter is changed in a case where an ND filter such as a liquid crystal is used whose density can be continuously changed. Thus, the operation of the ND filter may not be limited. Similarly, the shutter operation may not be limited as long as flicker does not occur. In this case, even if any exposure parameter is not fixed, a stable image can be output as a preview image by performing at least one of steps S308 and S312. Therefore, instead of setting the exposure control in the second mode to a mode for controlling at least one of the parameters using a fixed value, a mode in which the proper exposure range is widely set or a mode in which the exposure control speed is set to be slow may be used.

This embodiment illustratively limits the operations of the ND filter and shutter, but in order to avoid increased noise due to increased sensitivity and diffraction caused by narrowing the aperture, the operations of exposure parameters such as sensitivity and aperture stop may be limited and they may be controlled using fixed values.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of streamed computing systems, an optical disk (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

This embodiment can provide an image pickup apparatus that can perform proper exposure control.

This application claims the benefit of Japanese Patent Application No. 2023-042089, which was filed on Mar. 16, 2023, and which is hereby incorporated by reference herein in its entirety.

What is claimed is:

1. An image pickup apparatus comprising:
   an imaging unit configured to image a captured image; and
   a processor configured to control exposure of the captured image,
   wherein the processor is configured to control the exposure of the captured image in a first exposure mode in a case where the processor has not acquired first information indicating that the captured image will be streamed next, and the processor is configured to control the exposure of the captured image in a second exposure mode for controlling at least one of exposure parameters that are changeable in the first exposure mode until a state in which the captured image is streamed next is canceled, using an unchangeable state in a case where the processor has acquired the first information.

2. The image pickup apparatus according to claim 1, wherein the processor is configured to control the exposure of the captured image in the second mode in a case where the processor acquires second information indicating that the captured image is being streamed.

3. The image pickup apparatus according to claim 1, wherein an exposure control speed in the second exposure mode is lower than an exposure control speed in the first exposure mode.

4. The image pickup apparatus according to claim 1, wherein a range in which the exposure of the captured image is not controlled by the processor, based on previously set luminance in the second mode, is wider than the range in the first exposure mode.

5. The image pickup apparatus according to claim 1, wherein the first exposure mode and the second exposure mode have different control orders of exposure parameters.

6. The image pickup apparatus according to claim 1, wherein in a case where the processor acquires second information indicating that the captured image is being streamed, the processor is configured to control the exposure of the captured image in a third exposure mode for controlling at least one of the exposure parameters in the second exposure mode using a fixed value.

7. The image pickup apparatus according to claim 6, wherein an exposure control speed in the third exposure mode is lower than an exposure control speed in the second exposure mode.

8. The image pickup apparatus according to claim 6, wherein a range in which the exposure of the captured image is not controlled by the processor, based on previously set luminance in the third exposure mode, is wider than the range in the second exposure mode.

9. The image pickup apparatus according to claim 6, wherein the second exposure mode and the third exposure mode have different control orders of exposure parameters.

10. The image pickup apparatus according to claim 1, wherein the processor is configured to increase an exposure control speed for a predetermined period in a case where the exposure is not proper in the second exposure mode.

11. The image pickup apparatus according to claim 1, wherein the second exposure mode controls on optical filter for attenuating light to imaging sensor using a fixed value.

12. The image pickup apparatus according to claim 11, wherein the fixed value is determined based on a value of each parameter used in the first exposure mode just before acquiring the first information.

13. The image pickup apparatus according to claim 1, wherein the second exposure mode controls a shutter speed using a fixed value.

14. The image pickup apparatus according to claim 13, wherein the fixed value is a value determined based on a frequency of a light source.

15. An image pickup system comprising:

pluralities of the image pickup apparatuses according to claim 1;

a selection apparatus configured to acquire an image from the image pickup apparatus and to select an image to be streamed or an image to be streamed next, wherein one of the plurality of image pickup apparatuses that receives the first information or second information indicating that the captured image is in the stream from the selection apparatus is configured to control an exposure of the captured image by an exposure mode which controls at least one of the exposure parameters changeable in the first exposure mode in a fixed value, wherein an image pickup apparatus which does not receive either the first or the second information is configured to control the exposure of the captured image by the first exposure mode.

16. The image pickup apparatus according to claim 1, further comprising a communication unit configured to communicate with an external device, wherein the processor is configured to control the exposure of the captured image in the first exposure mode in a case where the first information is not received from the external device, and in the second exposure mode in a case where the first information is received from the external device.

17. The image pickup system according to claim 15, wherein the selection apparatus is configured to select the image to be streamed next based on the selecting operation by a user, and to transmit the first information to a first image pickup apparatus among the plurality of image pickup apparatuses that captures an image selected by the selecting operation by the user, wherein the selection apparatus is configured to transmit second information indicating the captured image is in the stream to the first image pickup apparatus based on a switching operation by the user.

18. A control method of an image pickup apparatus comprising:

an imaging step of imaging a captured image; and a control step of controlling exposure of the captured image, wherein the control step controls the exposure of the captured image in a first exposure mode in a case where the first information indicating that the captured image will be streamed next is not acquired, and the control step controls the exposure of the captured image in a second exposure mode for controlling at least one of the parameters that are changeable in the first exposure mode until a state in which the captured image is streamed next is canceled, using an unchangeable state in a case where the first information is acquired.

19. A non-transitory computer-readable storage medium storing a program to be executed by a computer of the control method according to claim 18.

* * * * *